Sept. 22, 1970     G. J. SCHAEFER, JR     3,529,489
REMOTE HAND THROTTLE CONTROL Filed Feb. 5, 1969     2 Sheets-Sheet 1

INVENTOR
GEORGE J. SCHAEFER, Jr.

BY *Semmes and Semmes*

ATTORNEYS

Sept. 22, 1970    G. J. SCHAEFER, JR    3,529,489
REMOTE HAND THROTTLE CONTROL
Filed Feb. 5, 1969    2 Sheets-Sheet 2

INVENTOR
GEORGE J. SCHAEFER, Jr.

BY *Semmes and Semmes*

ATTORNEYS

United States Patent Office 3,529,489
Patented Sept. 22, 1970

3,529,489
REMOTE HAND THROTTLE CONTROL
George J. Schaefer, Jr., 1420 S. 3rd St.,
Beatrice, Nebr. 68310
Filed Feb. 5, 1969, Ser. No. 796,874
Int. Cl. G05g 1/04; A01c 15/00
U.S. Cl. 74—526        10 Claims

ABSTRACT OF THE DISCLOSURE

A remote hand throttle control of the type used in regulating the flow of fertilizer or the like from a fertilizer distributor and including means for positively setting the control, so as to limit the degree of pulling a throttle control wire.

BACKGROUND OF THE INVENTION

Field of the invention

The invention relates to lawn spreaders, for example seed and fertilizer spreaders, which include a hopper for the seed or fertilizer, a distributor gate, and apertures formed in the bottom of the hopper for discharging the material. A control wire extends from a handle to the distributor gate so as to regulate the opening of the gate with respect to the apertures. Normally, the gate control is effected by a calibrated knob which is rotated so as to longitudinally distend the control wire and open the distributor gate. Principal shortcomings of this type of control reside in the lack of any positive locking in of the control, so as to prevent the gate from slipping further open or further closed. Also, if the distributor is being pulled behind the operator, it is difficult for the operator to determine if the calibrated knob has slipped or to recall the distribution setting which is hidden behind the pulling handle or shaft.

Description of the prior art

Pre-examination investigation has been conducted in the following classes:
Class 227, subclasses 177, 470–474, developing the following prior art references:

Mount—2,433,059     Liljenberg—2,839,223
Schaffer—2,519,707  Liljenberg—2,840,271
Juzwiak—2,678,145   Liljenberg—2,840,275
Juzwiak—2,710,116   Atkinson—3,122,273
Bond—2,767,887      Atkinson—3,224,636
Masters—2,796,203   Long—3,279,740

The Bond, Atkinson and Liljenberg concepts are concentional. Liljenberg 2,839,223 (FIGS. 5–11) teaches the use of a slotted calibration chart 35 in connection with a rotary knob 36 and pivoting handle 47. Atkinson 3,224,636 uses a notched control handle in connection with his spring-tensioned control arm 40.

Atkinson 3,122,273 and Juzwiak show similar rotary control knobs used in connection with a longitudinally extended control arm. Mount and Schaffer show the employment of compression spring assemblies in connection with control arms used in fertilizers.

SUMMARY OF THE INVENTION

According to the present invention, the rocker arm principle is used in connection with a throttle control wire extending to the distributor hopper gates. An arcuately opposed frame base and handpiece are pivoted to each other. The throttle control wire extends through the frame base and is connected to the handpiece and is moved, according as the handpiece is grasped in the operator's hand and pivoted with respect to the base. Setting of this degree of pivotability is accomplished by a spring tension yoke which is mountable within pairs of calibration notches in the frame base so as to limit the degree of pivotability of the handpiece. Accordingly, there is provided positive regulation of the on and off operation while, the entire control remains in the operator's hands or in his lap. Since the yoke is spring tensioned, there is a positive lock-in with less chance of slipping and adjustment is relatively easy from one pair of calibration notches to another pair of calibration notches. The frame base and handpiece utilize the fulcrum or center movement principle and do not require spring tensioning or other interconnection.

DESCRIPTION OF THE PREFERRED EMBODIMENTS

Figure 1:
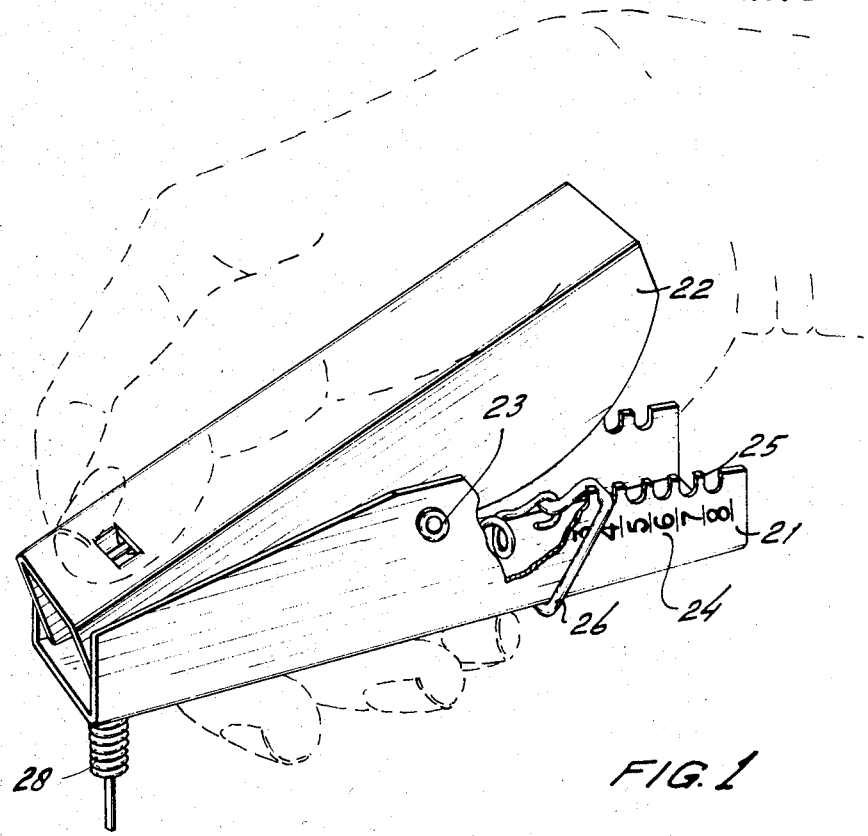
FIG. 1 is a perspective view of the remote hand throttle control device in hopper closed position, an operator's hand being shown in phantom.

According to the present invention, control frame base 21 pivotably supports handpiece 22 by means of pivot pin 23.

Frame base 21 includes stenciled numeral chart 24 disposed opposite corresponding pairs of flow calibration notches 25. Flow setting yoke 26 encircles frame base 21 and is seated within the flow calibration notches 25, so as to limit the degree of pivotability of handpiece 22 with respect to base 21, and, thus the extensibility of throttle control wire 30. Throttle control wire 30 may be seated within handpiece bracket 31 and extend through the opposed end of the frame base 21 via cable bushing 28 which is secured in base 21 by cable nut 29.

A tension spring 27 may be secured beneath cable nut 29 at on end and at its other end extend to yoke 26 depressed mid-portion, so as to seat the yoke 26 in the notches under tension.

Figure 2:
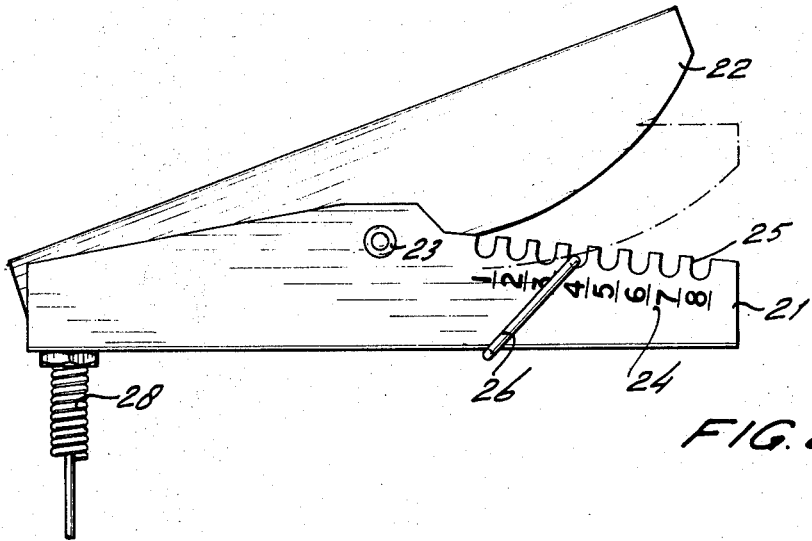
FIG. 2 is a side elevation, the open position of the handpiece being shown in phantom.
Figures 3, 4:
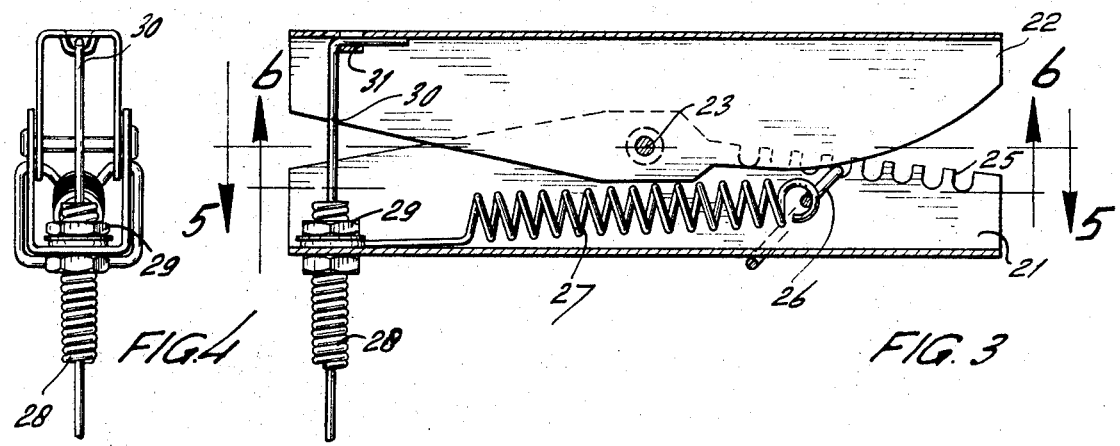
FIG. 3 is a longitudinal section, showing the device in hopper gate open position.
FIG. 4 is a transverse section.
Figure 5:
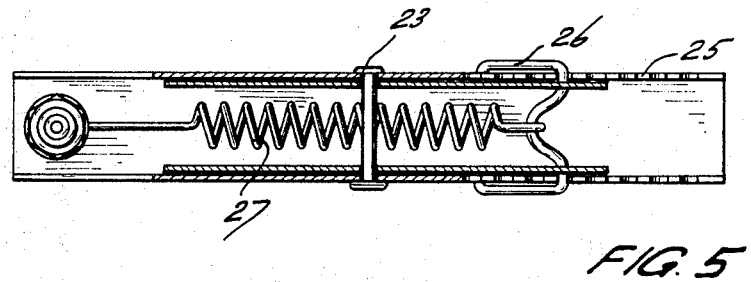
FIG. 5 is a horizontal sectional view taken along section line 5—5 of FIG. 4.
Figure 6:
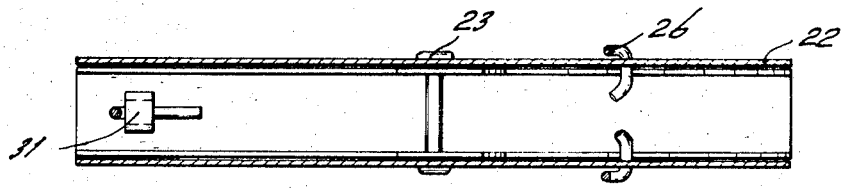
FIG. 6 is a horizontal sectional view taken along section line 6—6 of FIG. 3.

As illustrated in FIGS. 1 and 2, pivoting handpiece 22 in a rocker or teeter motion actuates and longitudinally distends control wire 30 which may extend to a distributor gate hopper or flow mechanism to provide "zero to eight," according as yoke 26 is set in notches 25. Positioning yoke 26 in the No. 1 setting (illustrated in FIG. 2) would provide minimum movement of control wire 30. Positioning of yoke in No. 8 pair of notches would provide for a maximum movement of control wire 30 and maximum flow or discharge from a hopper. In FIG. 1, the yoke is positioned in mid-position notches 4. Tension spring 27 holds yoke 26 in predetermined position until the calibration is changed manually. The closed or off position of handpiece 22 with respect to frame base 21, as illustrated in FIG. 1, is maintained by the friction of control wire 30 supported within cable bushing 28. The opposite curved end of handpiece 22 strikes yoke 26 which is positioned intermediate the upstanding sides of the frame base 21. Each pair of calibration notches varies pivotability of handpiece 22 one/eight inch, thus providing for a corresponding one/eight inch movement of the control wire. In the calibration notches illustrated numbers one through eight provide for an adjustment of one/eight inch in longitudinal distension of the control wire.

Manifestly, the structure may be varied without departing from the spirit of the claims.

I claim:
1. Remote hand throttle control comprising:
(A) a frame base having a plurality of flow calibration notches therein;
(B) a handpiece pivoted within said base so as to intersect said notches;
(C) a throttle control wire secured in said handpiece and extending to a throttle; and
(D) a yoke supported on said frame base and movable from calibration notch to calibration notch so as to limit the degree of pivotability of said handpiece with respect to said frame base.

2. Remote hand throttle control comprising a frame base having:
(A) upstanding sides defining a plurality of pairs of transverse flow calibration notches;
(B) a handpiece pivoted within said sides of said base, so that an end of said handpiece intersects said notches;
(C) a throttle wire connected to said handpiece and extending to throttle; and
(D) a yoke supported on said frame base and movable from one pair of notches to another pair of notches, so as to limit the degree of pivotability of said handpiece with respect to the base.

3. Remote hand throttle control as in claim 2, including:
(E) a tension wire seated in said base and extending to said yoke, so as to seat said yoke under tension within said pairs of calibration notches.

4. Remote hand throttle control as in claim 3, said control wire extending from a bracket in said handpiece, downwardly through said frame base towards said throttle.

5. Remote hand throttle control as in claim 4, said control wire extending between said upstanding sides of said frame base downwardly through a bushing supported in said base at an end opposite said pairs of calibration notches.

6. Remote hand throttle control as in claim 5, said frame base and said handpiece being of opposed arcuate configuration in side elevation and pivoted to one another by means of a pivot bar extending through the upstanding sides of said frame base and through complementary downwardly extending sides in said handpiece.

7. Remote hand throttle control as in claim 6, said yoke outwardly encircling said frame base and at its top including a pair of opposed shoulders seated in said selected pairs of notches.

8. Remote hand throttle control as in claim 7, said yoke including a depressed mid-portion intermediate opposed notches and extending downwardly between the upstanding sides of said frame base, as a seat for said tension spring.

9. Remote hand throttle control as in claim 8, said frame base and said handpiece vertically overlapping each other, so as to laterally stabilize each other at their point of pivot and at the end supporting said control wire.

10. Remote hand throttle control as in claim 9, said pairs of notches in said handpiece being calibrated to limit pivotability of said handpiece one/eight inch per pair of calibrations.

References Cited
UNITED STATES PATENTS

| | | | |
|---|---|---|---|
| 2,732,729 | 1/1956 | Joyce | 74—526 |
| 2,803,971 | 8/1957 | Turner | 74—526 |
| 2,818,747 | 1/1958 | Rich | 74—526 XR |
| 2,924,117 | 2/1960 | Byrd | 74—526 |
| 3,143,353 | 8/1964 | Henningsen et al. | |

DAVIS T. MOORHEAD, Primary Examiner

U.S. Cl. X.R.

74—491; 222—177, 470